United States Patent [19]

Despois et al.

[11] 4,165,945
[45] Aug. 28, 1979

[54] METHOD FOR STORING FLUID UNDERGROUND AT MAXIMUM PRESSURE P

[75] Inventors: Jacques Despois, Viroflay; Francis Nougaréde, La Celle Saint Cloud, both of France

[73] Assignees: Commissariat a l'Energie Atomique, Paris; Societe Nationale Elf Aquitaine, Courbevoie, both of France

[21] Appl. No.: 855,641

[22] Filed: Nov. 29, 1977

[30] Foreign Application Priority Data

Dec. 2, 1976 [FR] France ............................... 76 36283

[51] Int. Cl.² .............................................. B65G 5/00
[52] U.S. Cl. ........................................ 405/55; 220/404
[58] Field of Search .................. 61/0.5; 220/9 R, 18; 62/45

[56] References Cited

U.S. PATENT DOCUMENTS

| | | | |
|---|---|---|---|
| 3,330,122 | 7/1967 | Janner | 61/0.5 X |
| 3,557,558 | 1/1971 | Eakin | 61/0.5 |
| 3,952,531 | 4/1976 | Turner | 61/0.5 |
| 3,990,248 | 11/1976 | Calminder | 61/0.5 |

*Primary Examiner*—Jacob Shapiro
*Attorney, Agent, or Firm*—Sughrue, Rothwell, Mion, Zinn and Macpeak

[57] ABSTRACT

A method for storing fluid underground at maximum pressure p, comprising the steps of digging, at a depth at which the lithostatic pressure generated by the weight of the abovejacent soil formations is at least p, an underground cavity in which is made a tight deformable casing anchored to the cavity wall at some places only, while it can freely expand or contract in every direction between said anchoring places, then of injecting pressured fluid into said casing in order that the latter be fully applied against the cavity wall, the possible movements of which said casing subsequently follows by gliding, the pressure of said fluid being, at every moment, counterbalanced by the lithostatic pressure of the cavity walls transmitted to said fluid by the thus expanded casing.

10 Claims, 13 Drawing Figures

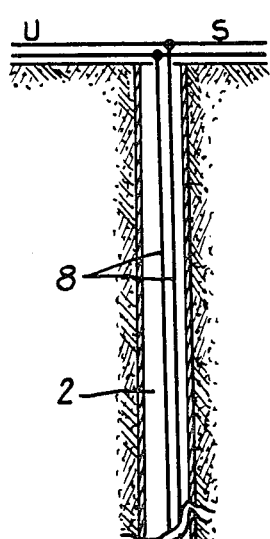
Fig.1a
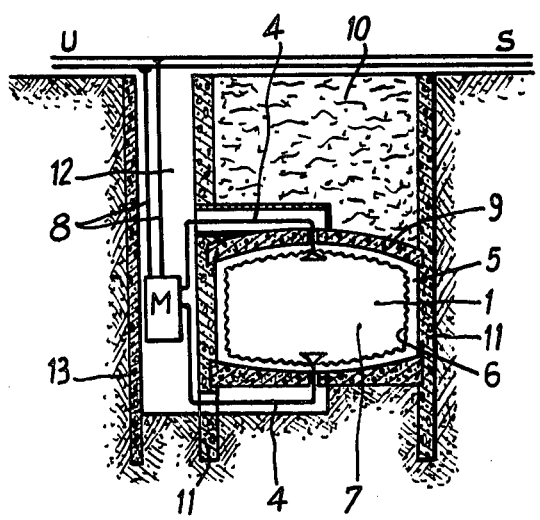
Fig.1b
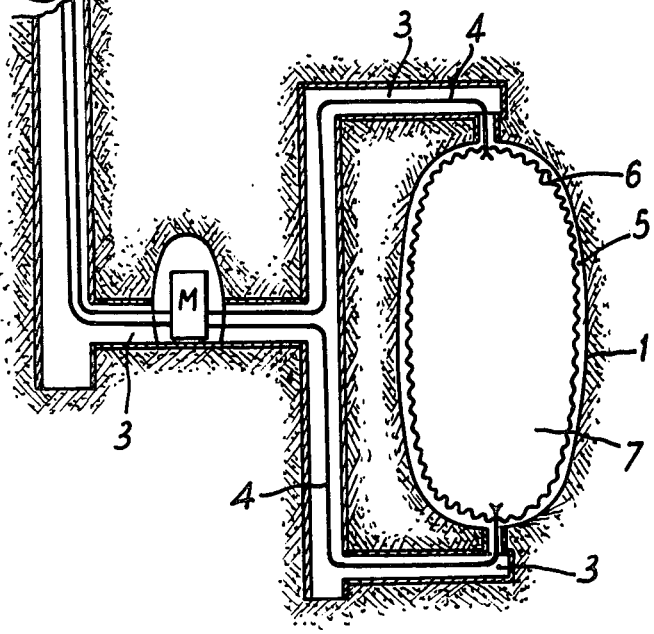

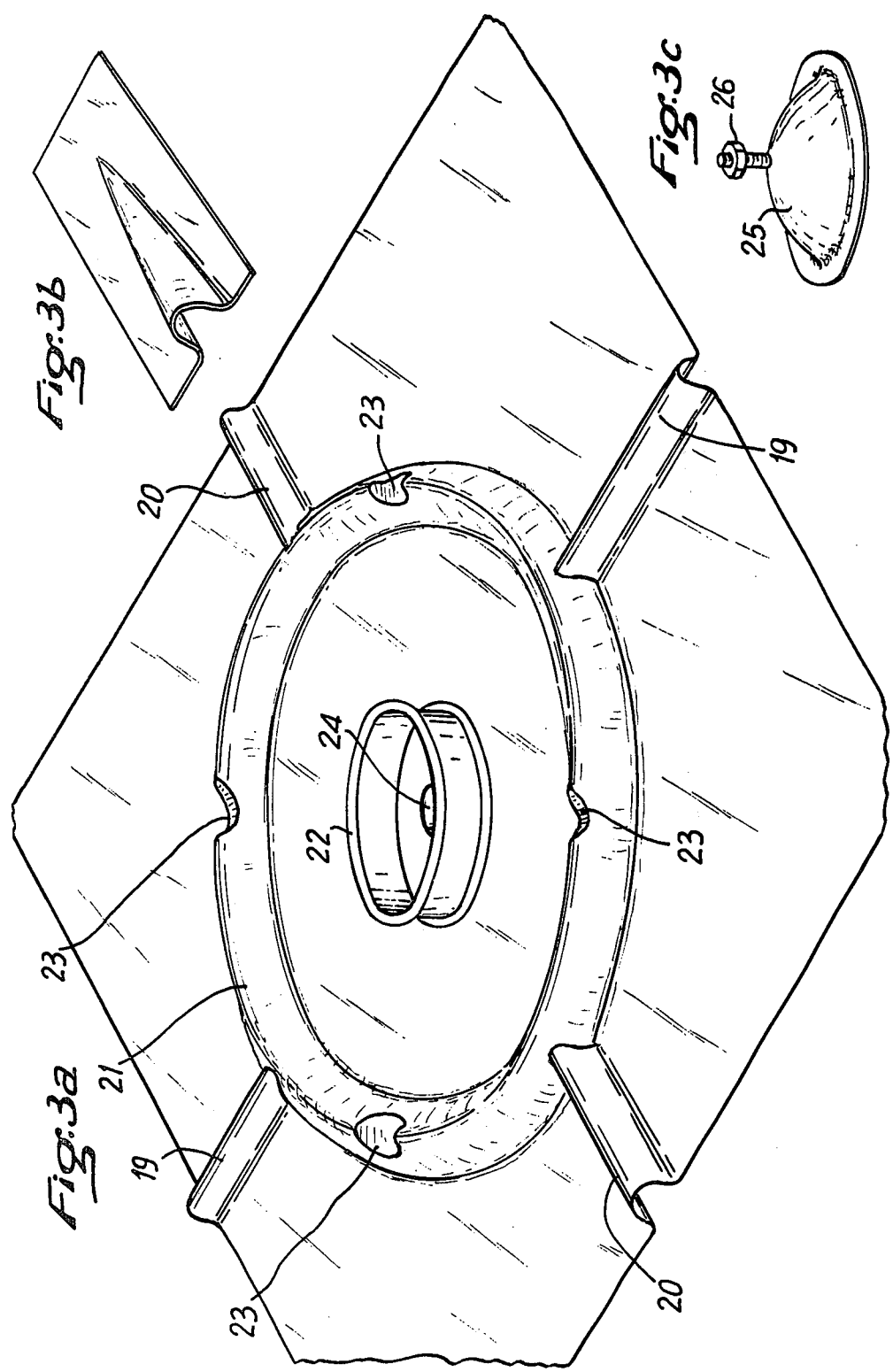

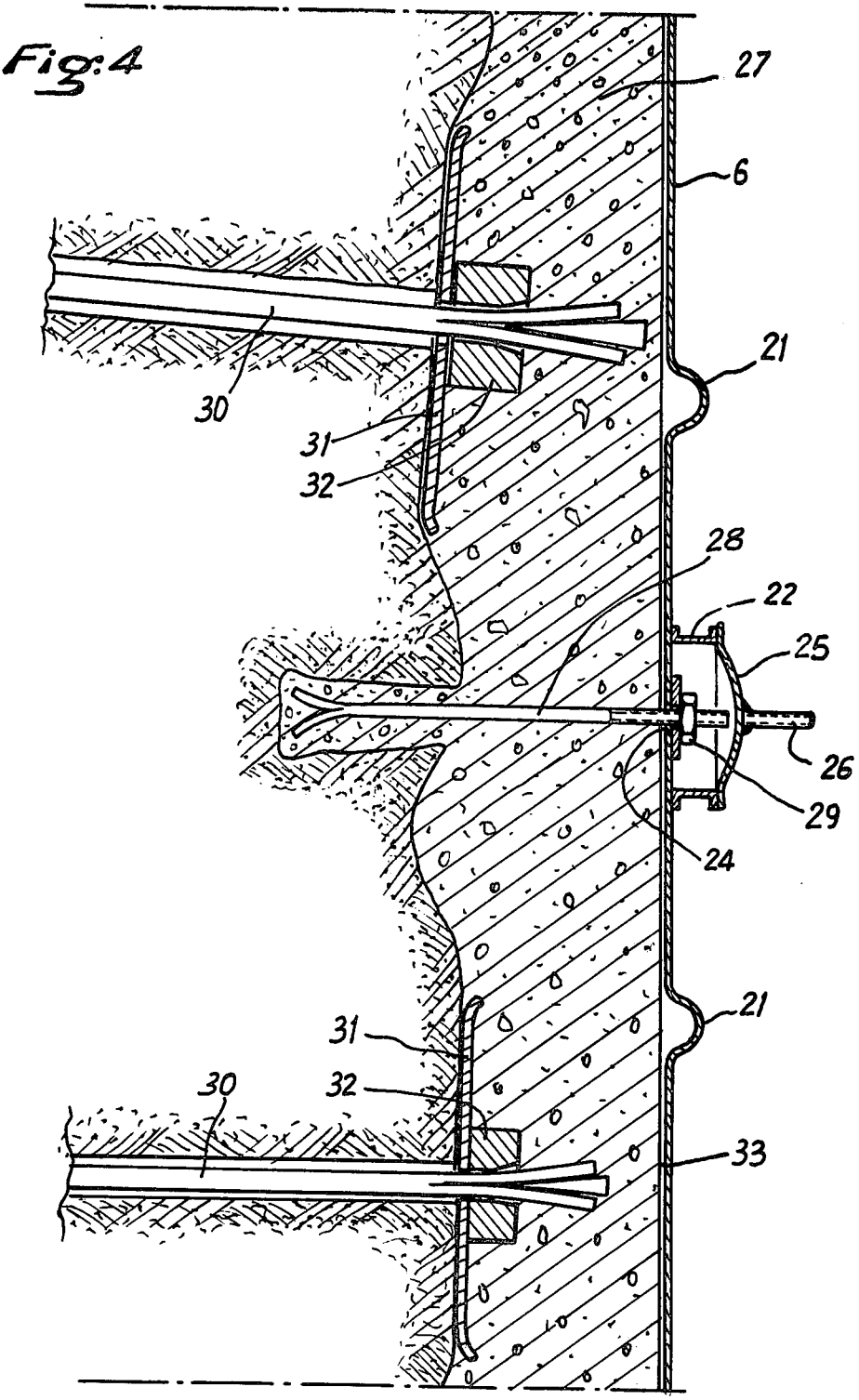

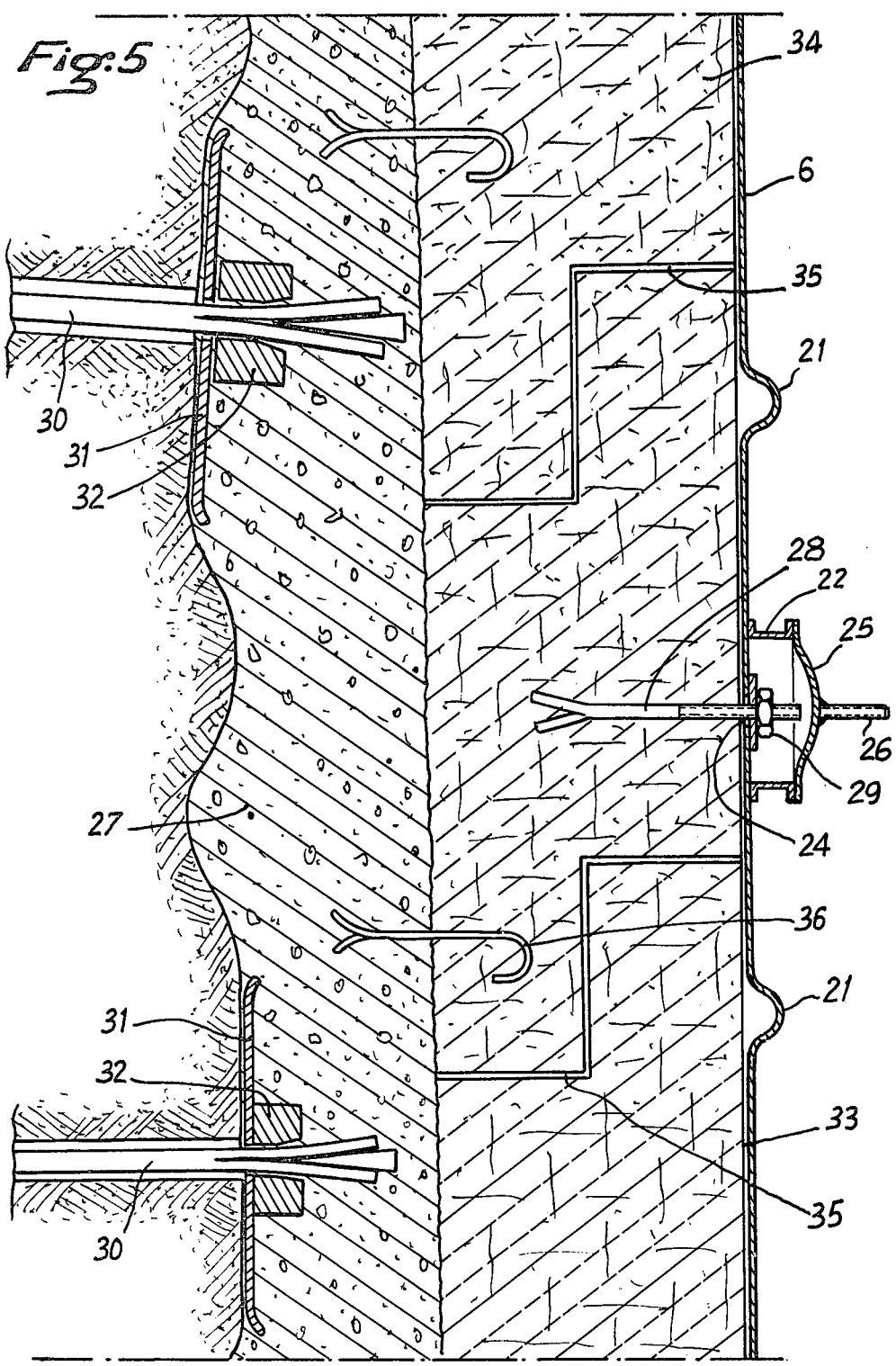

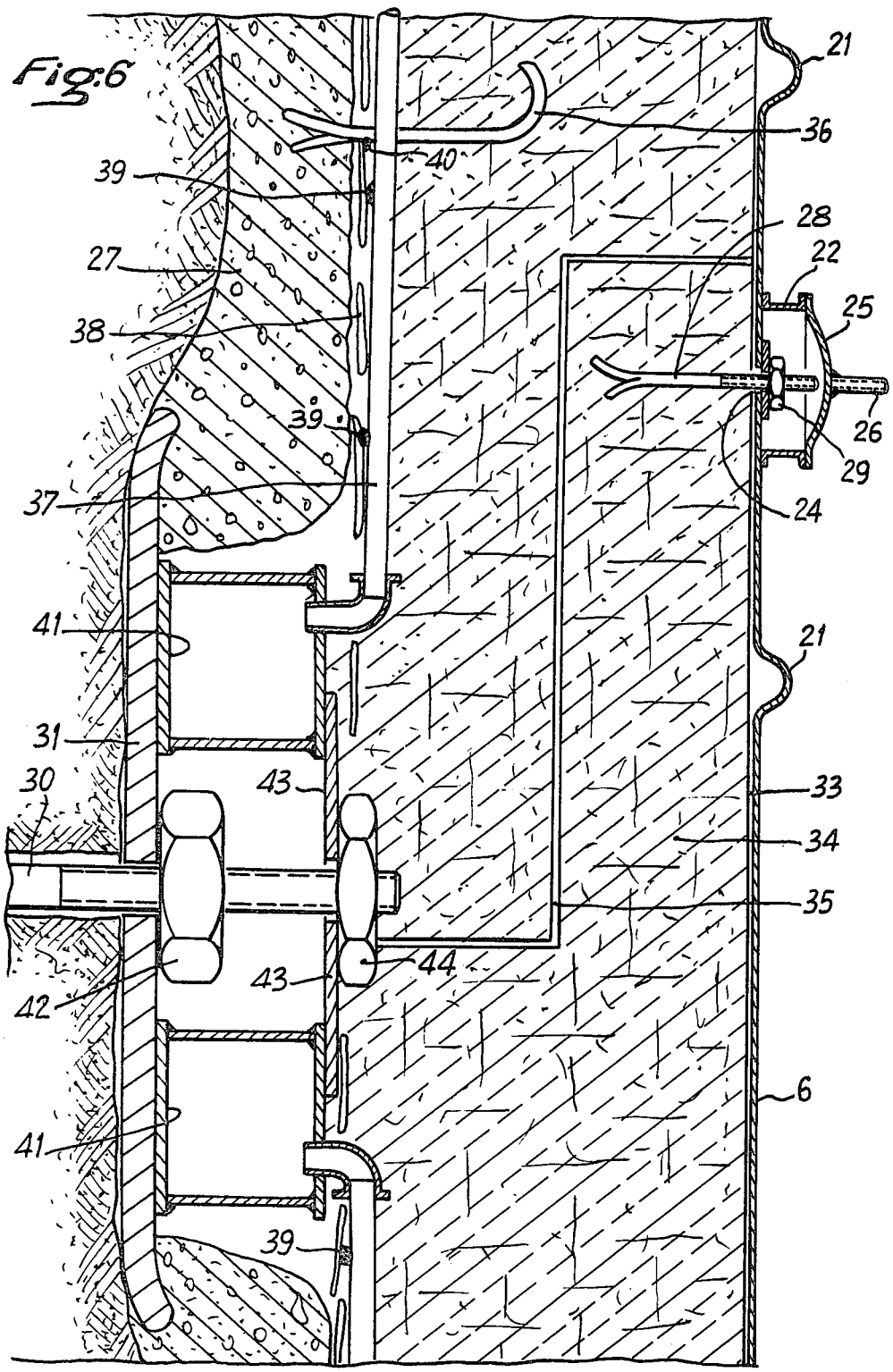

METHOD FOR STORING FLUID UNDERGROUND AT MAXIMUM PRESSURE P

It is known to make underground tanks in which pressurized fluids can be left in transit or be stored until they are recovered later on. The idea of an underground storage of heat through pressurized hot water was expounded, in particular, during the 8th World Conference on Energy (Bucarest, June 28, 1971).

Other modes of storage, e.g., compressed air, gas or radioactive waste, have already been contemplated or put into practice.

In the present state of the art, it is most often resorted to the hydrostatic pressure of the water contained in the ground to counterbalance the pressure within the cavity, in order that a lack of tightness, always to be feared in view of stresses already existing or generated on coatings, cannot give rise to important leakages. Therefore, in the case of high pressures, the depth required soon becomes unrealistic.

By way of example, in the case of water to be stored at 300° C. (570° F.), pressure being then of about 90 bars, the crown of the cavity would have to be at a depth of about 1000 meters (3300 ft).

Moreover, in the prior art, the fluid is usually in contact with the cavity walls as in French Pat. No. 2,231,277, viz, with the rock or a protective concrete, which induces chemical and thermal phenomena likely to alter both the cavity behaviour and the fluid composition. In order to obviate such drawbacks, it has already been suggested to store a liquid, namely superheated water, in a metal tank open in the upper portion thereof and built within the cavity under air, or gas pressure. This solution has the double drawback of requiring a large investment of money for building a whole tank underground and high operation expenses in view of the necessitating to maintain the cavity atmosphere under constant pressure, in spite of the volume variations of the stored material due to the temperature changes thereof (variations amounting to about 20% in the case of water raised from 20° C. to 200° C.).

In other instances, lithostatic pressure is resorted to for balancing internal pressure in various storage tanks, pressure-sustaining ducts or nuclear reactors (refer, in particular, to "Mecanique des roches et ses applications" published by Dunod, Paris 1967, pages 377 to 389). Lithostatic pressure as used in the art is the pressure which may be tolerated by an underground cavity sunk into rock at a certain depth without cracking. The lithostatic pressure depends directly on the height of the rocks situated above the cavity.

In French Pat. No. 2,286,260, it is suggested to store hot water in underground tanks situated at a depth that is sufficient to enable the weight of the rocks above the tank to generate a lithostatic pressure adapted to counter-balance the pressure of the water to be stored. In said patent, it is suggested, for achieving tightness, to use either a plastic material foil or a metal tank constituted by rings of U-shaped cross-section.

In either case, the solution advocated leads, in practice, to severe troubles, especially if the storage of hot fluids under high pressure is contemplated. Indeed, a plain foil of plastic material, in general, is not sufficiently resistent for sustaining the high pressures involved (e.g., of about 100 bars and upwards) without being torn, when hot; as for the metal tank, since it is made of rings and merely rests on the cavity floor, it is allowed but a longitudinal expansion (in only one privileged direction), which therefore precludes the possibility, for said tank, to adhere by all its points to the cavity wall under the pressure of the contents thereof and, later on, to follow the various "breathing" movements of said wall due, in particular, to thermal stresses generated in the sub-soil formations.

One object of the present invention is a method for storing a fluid under a maximum pressure p underground, said method obviating the above drawbacks, while in addition providing a few extra advantages.

Said storage method essentially comprises the steps of digging, at a depth at which the lithostatic pressure resulting from the weight of the soil formations is at least p, an underground cavity in which is made a deformable tight casing, fixed to the cavity wall by a few points only while being free to expand or retract in every direction between said points, then injecting the pressurized fluid into said casing in order that the latter lie flat by all the points thereof against the wall of the cavity, all the possible movements of which it follows subsequently by sliding, the pressure of said fluid being thus counterbalanced, at every moment, by the lithostatic pressure of the cavity wall transferred to the fluid through the thus-expanded casing.

The use of a very special tight diaphragm endowed, as a matter of fact, with two degrees of expansibility, namely the possibility of sliding along the rock-wall between its points of attachment to that wall and the possibility of "breathing" at right angles to said wall, in particular, by following the movements of the latter resulting from thermal expansions or contractions, permits to obtain the storage of pressurized fluid together with a uniform distribution of the pressure at every moment and over the whole area of the cavity.

In case of need, moreover, a smoothing coat can be inserted between the deformable casing and the cavity wall.

The present invention also relates to a tank for carrying out the above method, characterized in that it comprises, in an underground cavity dug at a depth at which the lithostatic pressure resulting from the weight of the soil formations is at least p, a deformable tight casing, fixed to the cavity-wall by a few points only while being free to expand or retract in every direction between said points, said casing being adapted to receive the pressurized fluid in order that said casing lie flat by all the points thereof against the wall of the cavity, all the possible movements of which it follows subsequently by sliding, the pressure of said fluid being thus counterbalanded, at every moment, by the lithostatic pressure of the cavity wall transferred to the fluid through the thus-expanded casing.

The tank forming the object of the present invention advantageously turns to profit the fact that the pressure within the cavity is distributed over the surrounding sub-soil formations against which the deformable tight wall is applied. Accordingly, the internal pressure in said cavity no longer needs to be counterbalanded by the surrounding hydrostatic pressure as in the prior art. It is only sufficient that the lithostatic pressure, namely the pressure exerted by the sub-soil formations themselves, counterbalances said internal pressure. The minimum safety depth is thus divided by a coefficient that is at least equal to the mean specific weight of the abovejacent formation, viz, by about 2.

In the above mentioned example, relating to water at the temperature of 300° C. (570° F.) under a pressure of 90 bars, the crown of the cavity would have to be at a depth of about 500 meters (1650 ft) instead of 1000 meters as in the prior art, and, in addition, the digging operation that required a lot of technical skill in the prior art and was moreover quite expensive although uncertain as to the results obtained, becomes, according to the present invention, a conventional application of the mining technique, provided geological conditions be normal. Moreover, in the case of smaller pressures, the digging of the cavity that would have required underground operations in the prior art, can now be carried out from the ground level, according to the so-called "covered trenches" method or to any other appropriate method.

Preferably, the tight deformable casing comprises a set of metal plates that are arc-welded or welded according to any suitable method capable of providing a very good tightness. Said metal plates are provided with a suitable number of appropriately shaped ribs ensuring a free play of the plates between the anchoring points.

Said metal plates are constituted by steel sheets, the thickness of which is determined by the internal pressure and the radius of curvature of the corrugations forming said ribs, which permits said plates to withstand the pressure at the ribs. Stresses on the flat portions applied against the sub-jacent material have not to be taken into account for determining the thickness, since the internal pressure is balanced by the reaction of the sub-jacent material. Another advantageous feature of the present invention is to be noted, resulting from the fact that it is possible to make use of relatively thin metal sheets, since the reduction of thicknesses is limited only by the fact that the corrugations, of necessity, must have feasible radiuses of curvature, providing a sufficient play of the coating, and that account must be taken of welding requirements as well as of resistance to corrosion and abrasion.

Other features of the invention will appear from the following description, given merely by way of exemplar, of the tank according to the invention with respect to the accompanying drawing, in which:

FIGS. 1a, 1b and 1c show three possible embodiments, respectively, corresponding to various uses;

FIG. 3a is a detail view of a typical portion of said metal plates, and FIGS. 3b and 3c represent the main fittings;

FIGS. 4 to 6 are various cross-sections of the coating, showing how the tight deformable casing is anchored.

Figure 1C:
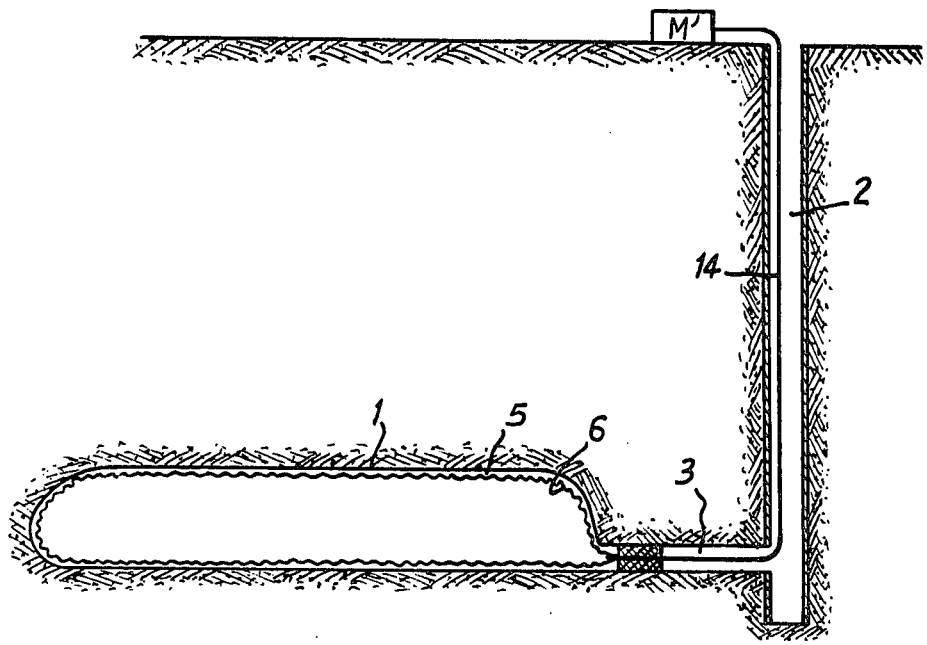

As shown in FIG. 1a the tank for pressurized fluids according to the invention comprises a cavity 1 dug underground via mineshaft 2 and galleries 3. FIG. 1a shows the shape of cavity 1 and an arrangement of galleries 3 corresponding to the storage of a pressurized hot liquid according to the so called "balancing" conventional method, i.e., as follows:

The cavity being filled up to the top with hot liquid surmounting the cold liquid, of higher specific weight, filling the cavity-bottom, the whole unit operates through transfer of the cold liquid from the cavity lower portion towards transfer-and-heating means M, and transfer of the water heated by said means M towards the upper portion of cavity 1, in the storage step, on the one hand, and reverse flow through ducts 4 with absorption of heat by said means M, in the exhaust step.

Cavity 1, if necessary, is provided with a suitable coat 5; tight deformable casing 6 spread over the cavity wall contains a liquid 7. The connection of means M with a surface network providing the transfer of a coolant fluid from a source S to a station of use, is obtained through ducts 8. FIG. 1b shows a variant corresponding to lower pressures, the caving being dug directly from the ground-level according to the so-called "covered trench" method. Cavity 1 is closed, at the upper portion thereof, by a veil of concrete or a metal structure 9, capable of withstanding the weight of filling earth 10 and leaning against moulded walls 11. Tight deformable casing 6 is applied against said moulded walls 11 and veil 9 and also against the bottom of the excavation, either directly or through a suitable coat 5.

The above described means M of FIG. 1a are mounted in a hole 12 defined by a moulded wall 13.

FIG. 1c shows a possible embodiment of tank for pressurized gas according to the invention. A cavity 1 has been dug via a shaft 2 and a gallery 3 and is no more than a horizontal gallery of larger cross-section.

Tight deformable casing 6 is spred over the wall of cavity 1, either directly or through a suitable coat 5. Pressurized gas is fed into, and from, cavity 1 by means of a duct 14 connecting the tank to filling and exhaust means M' via shaft 2.

While FIGS. 1a to 1c comprise but a single cavity, quite obviously a tank according to the invention can comprise a plurality of cavities of various shapes and arranged in a number of possible ways; in fact, the main feature of the tank according to the invention lies in the presence of tight deformable casing 6, whatever the use, shape and size of the thus defined space may be.

Figure 2:
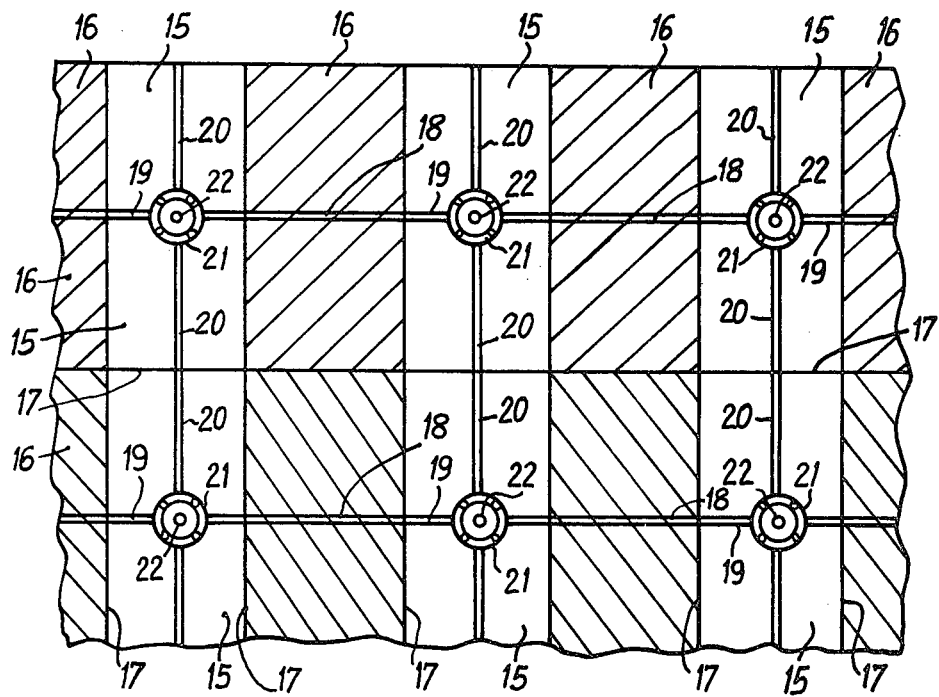
FIG. 2 is a general view of a deformable tight casing formed of welded ribbed metal plates.

In FIG. 2 is shown a possible embodiment of a tight deformable casing, constituted by a plurality of metal sheets, arc-welded or welded according to any suitable method, comprising an appropriate number of ribs of suitable shape adapted to provide the free-play of said plurality of plates between their anchoring points. Preferably, said plurality of metal plates is constituted by an assembly of embossed metal sheets provided with ribs that comprise one or several corrugations, said sheets being of two different types, viz, anchoring sheets 15 and connecting sheets 16, the latter being joined by means of welds 17, either butt-welds or lap-welds, or by a metal strip (not shown).

Connecting sheets 16 are but plain flat sheets in which a median rib 18 has been embossed. Said connecting sheets are supported only by adjacent anchoring sheets and have no anchoring point whatever in the sub-jacent material.

Anchoring sheets 15 are provided with ribs 19 and 20 at right angles that meet at the sheet center through a distributing rib 21 surrounding anchorage device 22.

The tight deformable casing according to the latter embodiment has a number of advantages:

The metal sheets can be formed merely by an embossing operation, contrary to those sheets for liquid-gas tanks, the latter sheets having to be treated according to more intricate methods, in view of the fact that they are subjected to temperatures at which the metal becomes brittle;

Since but two types of metal-sheets are used, the present invention allows an easy prefabrication of said sheets;

FIG. 2 corresponds to the coating of a developable surface, but it is easy matter to adjust a sheet to the accurate dimensions of the cavity and to cover non-developable surfaces. The anchoring sheets 15 are usually used in their entirely, but, in case of need, it is possible to tailor them, taking great care, however, not to cut distribution rib 21.

On the other hand, connecting sheets 16, being of simple structure with but a single rib, can be adjusted to the cavity dimensions. By cutting out portions of, e.g., triangular shape, in said connecting sheets, it is possible to warp the whole metal-coating of the cavity and apply same on surfaces of spherical or ogival shape or the like.

In FIG. 3a are shown distribution-rib 21 and anchorage device 22 more in detail.

Distribution-rib 21 is in the shape of a polygon or a closed curved line, e.g., a circle as shown in the figure. It is substantially more portruding than adjoining perpendicular ribs 19 and 20.

At four places, in the vicinity of the intersections of distribution rib 21 with the bisectors of the angles defined by perpendicular ribs 19 and 20, said distribution rib 21 is provided with saddle-shaped carvings 23 adapted to lower the level of its ridge so as to give the latter substantially the same height as the tops of perpendicular ribs 19, 20.

Anchorage device 22 is constituted by a sleeve, or bushing, encircling anchorage hole 24.

For clearness sake, all the ribs of sheets 15 and 16 including distribution rib 21, have been shown in the figure as comprising but a single corrugation, or wave; however, it is quite obvious that larger movements can be obtained without increasing neither the thickness (and, therefore, the weight) of the tight deformable casing, nor the cost and stiffness thereof, by using sheets with ribs comprising several parallel ribs.

FIGS. 3b and 3c show a possible embodiment of weldable fittings for rendering tight the deformable casing according to FIGS. 2 and 3a.

More precisely, FIG. 3b shows a connecting member to be used for applying the tight deformable casing agains non developable surfaces, assuming ribs with only one corrugation (such as ribs 18, 19 and 20) are used. Quite obviously connecting members with several corrugations might be contemplated. This connecting member is used as follows: the cuttings of, e.g., triangular shape, made in connecting sheets 16 in the case of non developable surfaces obviously cause anchorage sheets 15 to draw nearer to each other. Whenever their spacing might become too narrow, it is advisable to exchange some of them (as a rule, every second one) for connecting sheets 16. The latter are usually welded as an extension of anchorage sheets, except at interrupted rib 20 where, for ensuring tightness, it is necessary to provide a connecting member, such as that of FIG. 3b., welded astraddle both metal sheets.

FIG. 3c shows a cup shaped sealing cap 25 of thick metal sheet, the diameter of which is the same as that of anchoring sleeve, or bushing, 22 as shown in FIG. 3a.

Once an anchoring sheet 15 has been fixed to the cavity wall (or to a suitable coat first applied to said wall), sealing cap 25 is welded to said sleeve of anchoring device 22. Fluid leakages through anchoring hole 24 are thus prevented.

It is to be noted that, in FIG. 3c, an externally threaded pin 26, provided with a nut, is welded to sealing cap 25; in fact, a ring or any other suitable fastening device might be used instead of said threaded pin.

Such an optimal arrangement permits to use sealing caps 25 as fastening means for scaffolding or any devices used in the course of building the tank, or for maintenance operations or repairs.

As shown in FIG. 4, tight deformable casing 6 (which can with advantage be of the type of FIGS. 2 and 3a) rests on a concrete lining 27 permitting to give a definitive shape to the cavity wall, applied before fixing tight deformable casing 6 by means of anchoring rods 28 passing through anchoring holes 24; anchoring nuts 29 are screwed on the externally threaded ends of said rods 28. Sealing cap 25 is subsequently welded to the sleeve of anchoring device 22.

Again in FIG. 4 are shown anchoring bolts 30 provided with a distributing plate 31 and an anchoring device 32, the whole being arranged according to usual practice and constituting a paramount supporting means for such cavities as those used as tanks according to the invention.

It can be contemplated to insert a lubricant substance 33 (or any other product likely to lessen friction forces at the operating temperatures involved), between tight metal casing 6 and the subjacent material.

Such an arrangement, which is to be found in FIGS. 5 and 6, makes it possible to restrict abrasion resulting from friction between the deformable casing and the subjacent material, and therefore proves to be favorable whatever the shape of said casing and of the subjacent material may be.

FIG. 5 shows another embodiment of the coat against which tight deformable casing 6 is applied. As in the case of FIG. 4, anchoring bolts 30 are provided, with a distributing plate 31 and an anchoring device 32, said bolt still constituting a paramount supporting means. The cavity walls are rendered smoother by means of a concrete lining 27 as above. However, in the present instance, between tight deformable casing 6 and concrete lining 27, is sandwiched a thermally insulating material 34 of appropriate thickness, capable of withstanding the tank internal pressure transmitted through casing 6.

In FIG. 5, such thermally insulating medium, by way of example, is constituted by a concrete layer of low thermal conductivity, in which can be provided expansion joints 35 since tightness is ensured by casing 6. Said thermally insulating medium 34 is fastened to concrete lining 27 by means of hooks 36, whereas the tight deformable casing is fixed, as shown in FIG. 4, by means of anchoring rods 28 inserted into the thermally insulating material. Preferably, hooks 26 are not in alignment with anchoring bolts 30 and anchoring rods 30, nor in the immediate vicinity thereof, so as to avoid or restrict, thermal bridges. Such an arrangement permits to limit the thermal flow between the fluid in the tank and the surrounding sub-soil formations.

FIG. 6 shows a more elaborate embodiment of the coat against which deformable casing 6 is applied. Generally of a structure similar to that shown in FIG. 5, the coat, between concrete lining 27 and thermally insulating material 34, additionally comprises a network of ducts 37 in which flows a coolant fluid. With a view to restricting the number of ducts 37, it is preferable to provide a metal grid, a lattice of expanded metal or any other suitable thermally conductive material 38, thermally connected to ducts 37 and hooks 36, e.g., by welding spots 39,40, respectively. Such grid, lattice or thermally conductive material constitute a substantially isothermal surface at the average temperature of the coolant fluid flowing in ducts 37. The circulation and cooling down of said fluid are obtained through pumping means and exchangers, e.g., air coolants or means for exchanging heat with a heat sink (a river or the sea), such auxiliary means being outside the cavity and not shown.

The amount of heat thus dissipated varies only according to the temperature differential between coating 6 and the coolant fluid, to the thickness of thermally insulating medium 34 and to the thermal conductivity thereof. A coherent selection of the values of these parameters will make it possible to restrict the dissipation of heat to a reasonable value. In order to avoid troubles that might result from the thermal expansion of anchoring bolts 30. it is preferable to maintain said bolts at the same temperature as the coolant fluid. To this end is diagrammatically shown, in FIG. 6, a connecting box 41 connected to ducts 37 around the head of an anchoring bolt 30. Thermal continuity between anchoring bolt 30 and connecting box 41 is preferably obtained through the contact of the latter with distributing box 31, of usual design, used for maintaining anchoring bolt 30 in traction by means of nut 42. Connecting box 41 is maintained in position by means of a counter-plate 43 contributing to ensure the requested thermal continuity, said counter-plate being attached to anchoring bolt 30 by means of an anchoring nut 44. The type of cavity coat as shown in FIG. 6 is especially suited for high temperatures. Inserting a thermally insulating medium, although restricting the flow of heat, is not sufficient however for preventing the temperature of adjacent sub-soil formations from increasing gradually, which may give rise to troubles resulting from induced mechanical stresses.

Figure 7A:
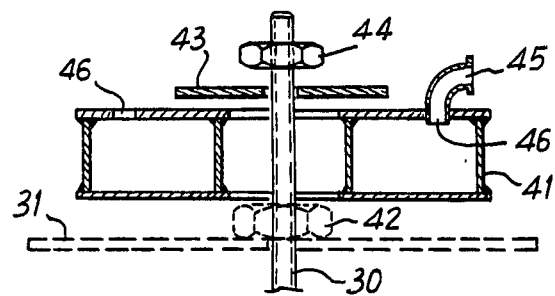
FIGS. 7a to 7c are detail views relating to advantageous fittings forming part of the coating according to FIG. 6.
Figure 7B:
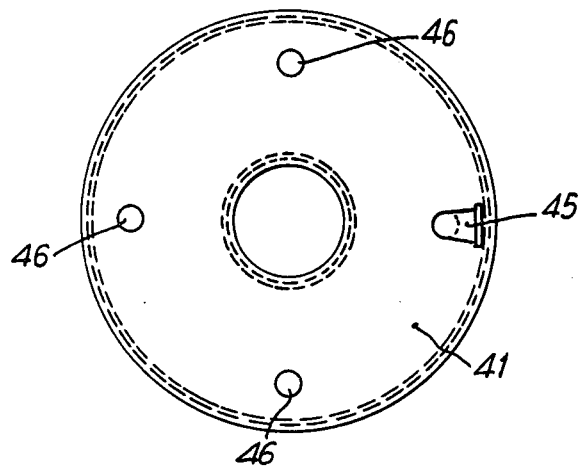

While the calculation of such stresses is already intricate in the case of a well known medium, it can lead to a severe disappointment when applied to a natural medium, the parameters of which are, of necessity, not very well known. The rise of the soil temperature therefore leads to hazards which, in practice, it is impossible to assess as regards the tank stability. The arrangement of FIG. 6 permits to delete, or at least lessen, the soil temperature increase. FIGS. 7a and 7b shown details of a possible embodiment of connecting box 41, in cross section and as seen from above, respectively. In FIG. 7a are show in dotted line an anchoring bolt 30, with its distributing plate 31 and its anchoring nut 42. Such a bolt is fixed as follows: after having drilled a bore of suitable length in the cavity wall, the bolt is provisionally fixed to the bore end.

A flexible tube is forced into the annular space defined between the anchoring bolt and the soil; distribution plate 31 is then inserted and anchoring nut 42 is only partially screwed so as to allow the flexible tube to penetrate freely. A yoke (not shown) provided with two jacks applied against the sub-soil formations is previously screwed instead of anchoring nut 44, then anchoring bolt 30 is put in tension by means of said jacks. Then concrete is injected through the flexible tube, the latter being gradually extracted from the bore.

Once a sufficient amount of concrete has been injected, the flexible tube is withdrawn and plate 31 is locked by means of nut 42.

When the concrete is set, the jacks are released and the yoke is unscrewed. It is then possible to mount box 41 and to lock same by means of counter-plate 43 and anchoring nut 44. It is, then, only sufficient to make connections with ducts 37 by means of crooked fittings 45 (FIG. 7a).

FIGS. 7a and 7b permit to understand the principle of box 41. In these figures said box 41 is assumed to be of circular shape and constituted by welded sheets; however, neither the shape of these boxes, nor the way they are manufactured, nor the material of which they are made, are specific features of the invention.

In the example represented in FIGS. 7a and 7b, the box is made of thin metal sheet and it is all the thinner as thermally insulating material 34 is thicker and stiffer. Box 41 is of annular shape and comprises several threaded ports in its upper surface. FIGS. 7a and 7b represent a box with four ports, each of which is provided with a crooked fitting 45 (only one of which is shown in the figure).

Figure 7C:
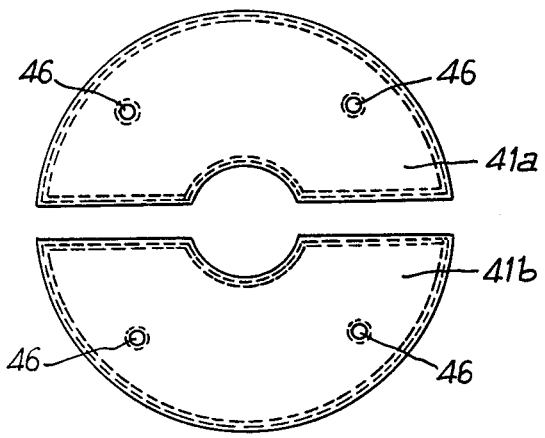

FIG. 7c shows, seen from above, a set of two half boxes (41a, 41b) adapted to ensure the cooling of anchorage bolt 30 via two distinct circuits, which, in some cases, can be advantageous as regards the general tank safety.

What is claimed is:

1. A method for storing fluid underground at maximum pressure p, comprising the steps of providing, at a depth at which the lithostatic pressure generated by the weight of the above-jacent soil formations is at least p, an underground cavity, locating a tight deformable casing in said underground cavity, anchoring said cavity to the cavity wall, and storing pressurized fluid in said tight deformable casing so that said casing is fully applied against the cavity wall; said casing being anchored to the cavity wall at a sufficient number of places so as to be adapted to expand or contract to follow the possible movements of the cavity wall whereby the pressure of said fluid is, at every moment, counterbalanced by the lithostatic pressure of the cavity wall transmitted to said fluid by said casing.

2. A method for storing fluid as set forth in claim 1, further comprising the step of inserting a filling material between said deformable casing and said cavity wall to smooth over the irregularities of the cavity wall.

3. A tank for storing fluid at maximum pressure p in an underground cavity located at a depth at which the lithostatic pressure generated by the weight of the abovejacent soil is at least p comprising a fluid tight deformable casing comprised of a plurality of welded metal plates and anchoring means for securing at least some of said metal plates to the walls of said cavity at a plurality of spaced apart locations, said plates having rib means which will allow said casing to expand or contract intermediate said anchoring means to allow said casing to conform to the shape of said cavity upon the initial introduction of a pressurized fluid and upon any subsequent deformation of the cavity configuration.

4. A tank for storing pressurized fluid as set forth in claim 3, wherein said rib means on each of said metal plates is comprised of at least one corrugation, said metal plates including anchoring metal sheets and connecting metal sheets, said anchoring metal sheets having two corrugations disposed at right angles to each other and an endless distributing corrugation disposed about the center of each anchoring metal plate and intersecting said two corrugations disposed at right angles to each other, said distributing corrugation on each plate being substantially higher than the other corrugations on said plate and being provided in the vicinity of the bisectors of the rights angles with saddle shaped notches having their bottoms disposed in a plane tangential to the tops of the other ribs on said plate, an aperture disposed substantially at the center of said anchoring metal plates through which said anchoring means extends, sleeve means surrounding said aperture and a sealing cap secured to said sleeve to cover said anchoring means, the rib means of said connecting metal plates being comprised of a single median corrugation, each connecting metal plate being welded to adjacent metal plates with the corrugation thereon disposed in alignment with the corrugations of said anchoring metal plates.

5. A tank for storing pressurized fluid as set forth in claim 4, wherein said sealing cap includes support means secured thereto and extending into the interior of said tank.

6. A tank for storing pressurized fluid as set forth in claim 4, further comprising lubricating means disposed on the external surface of said casing.

7. A tank for storing pressurized fluid as set forth in claim 4, further comprising filling means disposed intermediate the walls of said cavity and said fluid tight casing to smooth the irregularities of the cavity walls.

8. A tank for storing pressurized fluid as set forth in claim 7, further comprising insulating means disposed intermediate said filling means and said casing.

9. A tank for storing pressurized fluid as set forth in claim 8, further comprising duct means disposed intermediate said filling means and said insulating means adapted to carry a coolant fluid and metal grid means of thermally conducting material being welded to said duct means.

10. A tank for storing pressurized fluid as set forth in claim 9, wherein said anchoring means includes at least one bolt means adapted to be secured to the wall of the casing and further comprising cooling chamber means substantially surrounding said bolt means, said cooling chamber means being disposed in fluid communication with said duct means and being disposed in thermal contact with said bolt means whereby the walls of said cavity are substantially insulated from a high temperature fluid stored in said tank.

* * * * *